April 21, 1925.
J. A. SPERRY
1,534,615
MOLDING MACHINE
Filed April 19, 1922     5 Sheets-Sheet 3
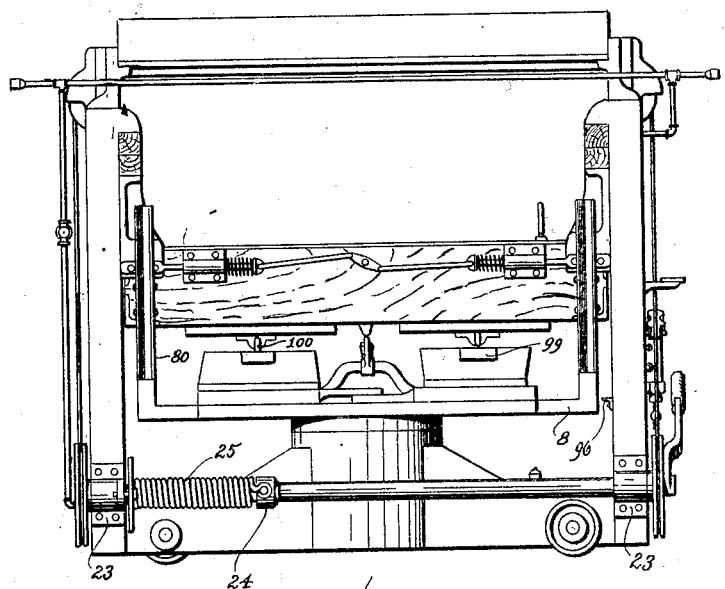
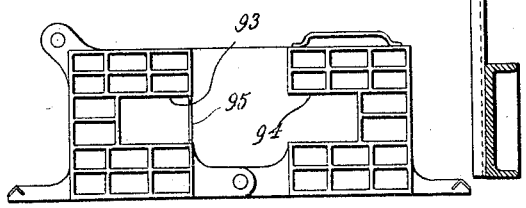
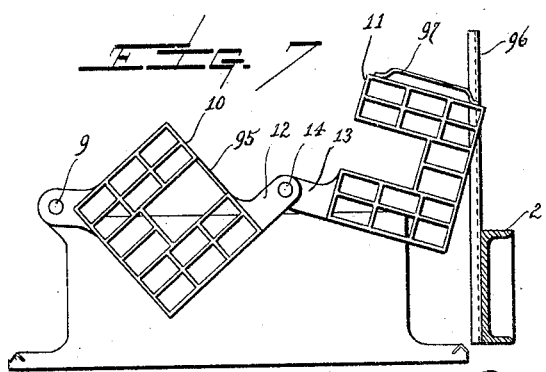
INVENTOR.
JOHN A. SPERRY.
BY
ATTORNEY.

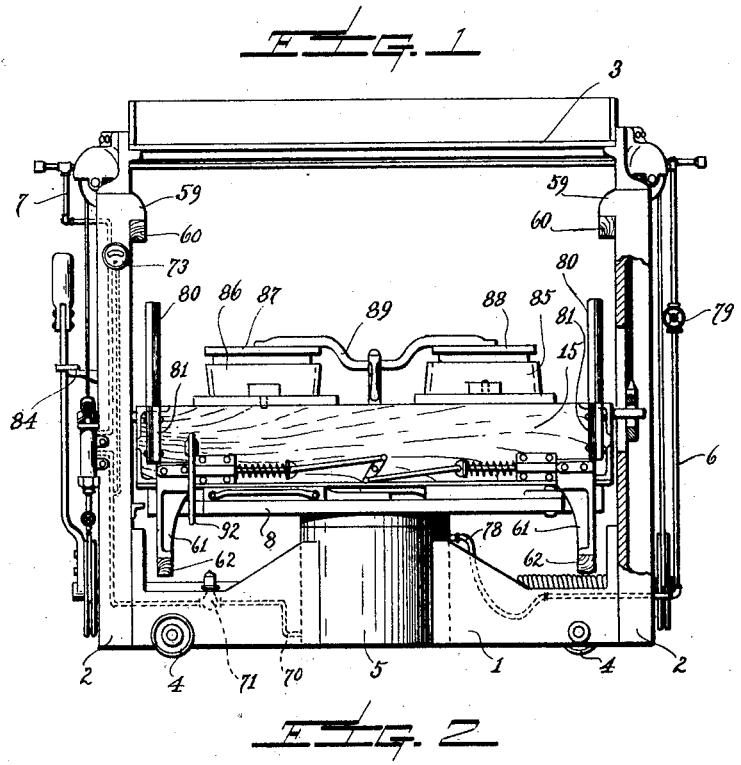
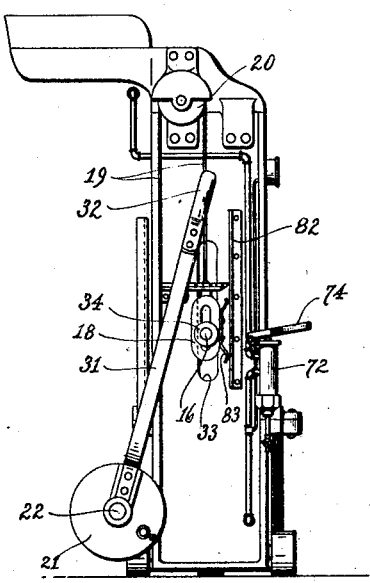

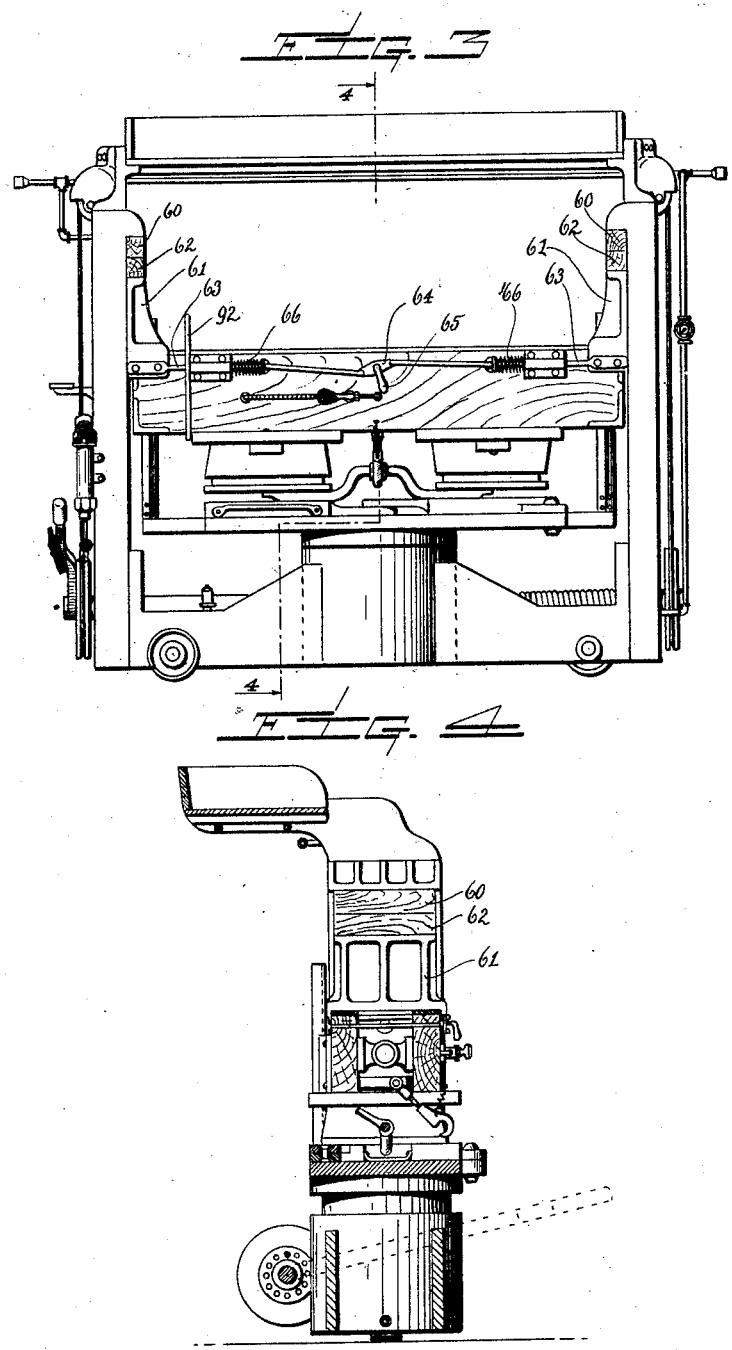

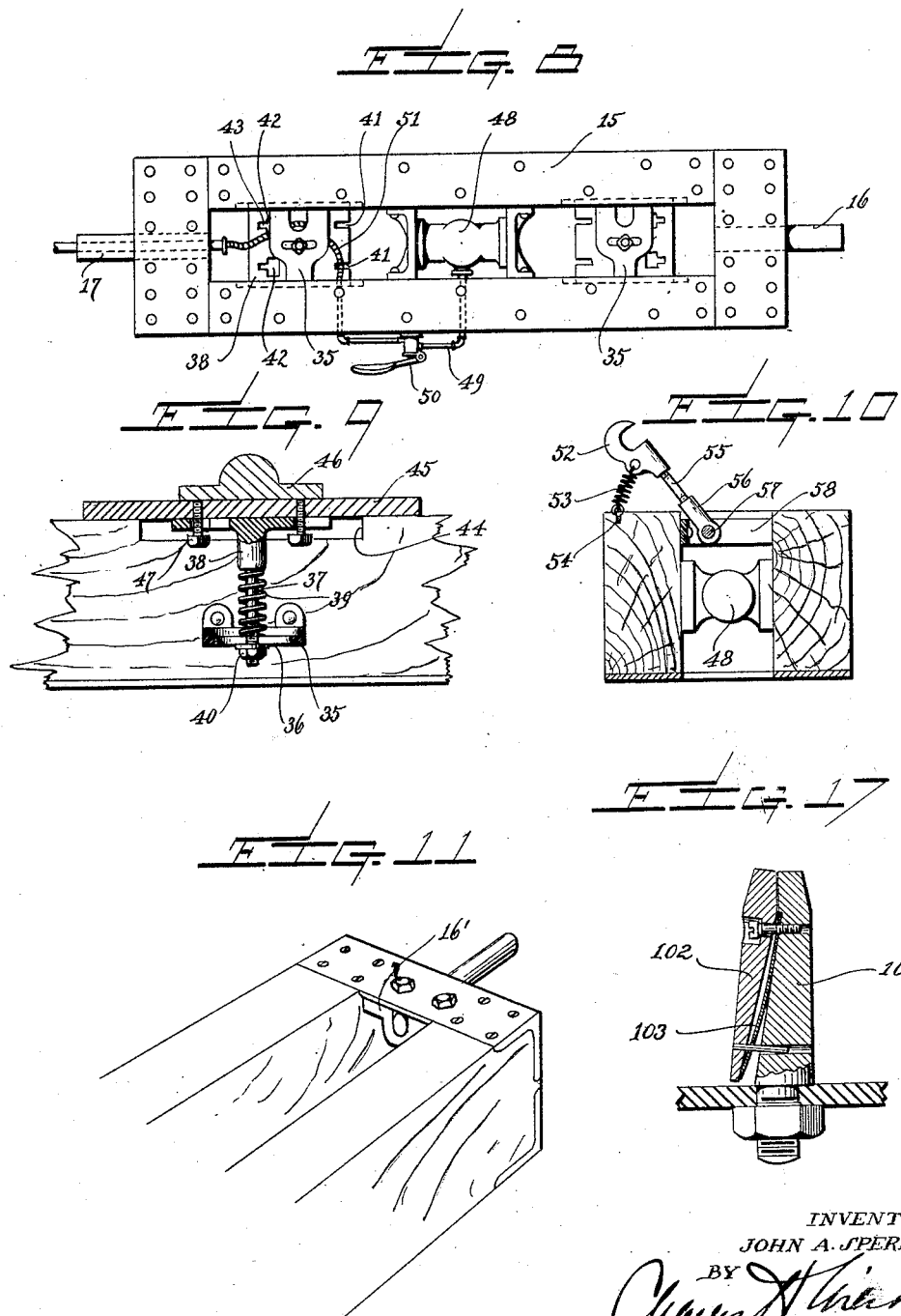

April 21, 1925.  
J. A. SPERRY  
MOLDING MACHINE  
Filed April 19, 1922  5 Sheets-Sheet 5
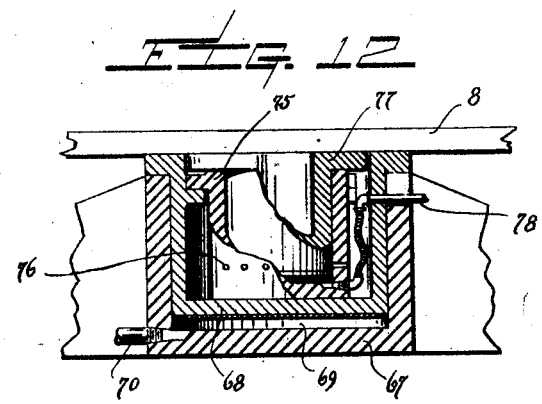
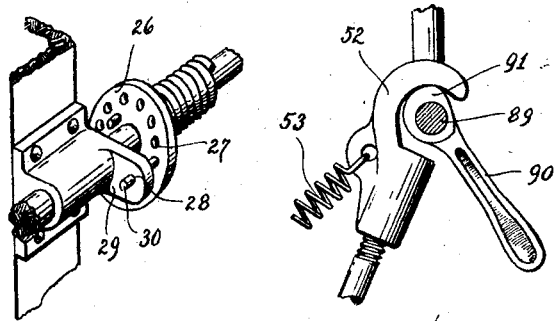
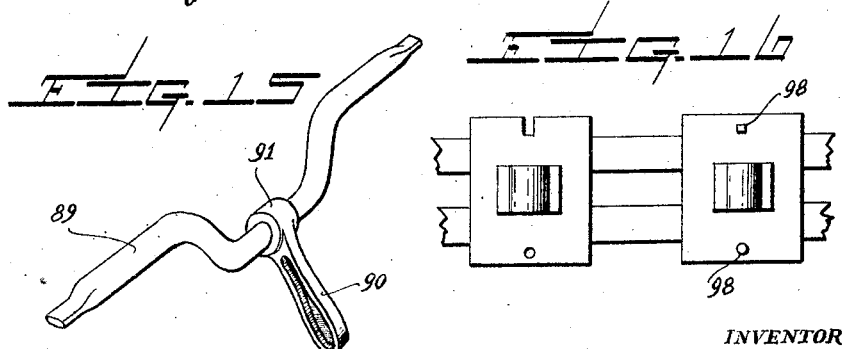
INVENTOR.  
JOHN A. SPERRY.  
BY  
ATTORNEY.

Patented Apr. 21, 1925.

1,534,615

UNITED STATES PATENT OFFICE.

JOHN A. SPERRY, OF MUNNSVILLE, NEW YORK.

MOLDING MACHINE.

Application filed April 19, 1922. Serial No. 555,575.

*To all whom it may concern:*

Be it known that I, JOHN A. SPERRY, of Munnsville, county of Madison, and State of New York, have invented certain new and useful Improvements in a Molding Machine, of which the following is a specification.

This invention relates to molding machines, and more particularly to a machine in which all the various operations necessary in producing a sand mold may be carried on.

One object of the invention is to provide a new and improved machine which shall be compact and easily handled, providing all the necessary instrumentalities for the production of sand molds.

Another object of the invention is to provide a new and improved machine of the type specified, which shall be of strong and rugged construction, easily manipulated by a single operator, and provided with a source of power so that various laborious operations incidental to the production of molds may be performed by the application of power.

Another object of the invention is to provide a new and improved machine of the type specified, in which there are included means for ramming the sand about the pattern, and drawing the pattern either by hand manipulation or by power.

Still another object of the invention is to provide a new and improved machine of the type specified, in which all the necessary instrumentalities shall be combined into a single structure, various parts being conveniently arranged so as to be easily within the control of a single operator, certain of the moving parts being so designed as to compensate for wear, whereby the mold will be accurately formed, and the patterns may be drawn so as to leave sharp clean edges.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings, wherein I have shown preferred forms of embodiment of my invention:

Figure 1 is a view of the machine in front elevation.

Figure 2 is a view of the machine in end elevation.

Figure 3 is a view of the machine, similar to Figure 1, the mold being partially completed, and various parts in inverted position.

Figure 4 is a view in vertical cross-section on the line 4—4 of Figure 3.

Figure 5 is a rear view in elevation with the parts in the position indicated in Figure 3.

Figure 6 is a top plan view of a detail of the machine.

Figure 7 is a view similar to Figure 6 showing the parts in displaced position.

Figure 8 is a bottom plan view of the cradle.

Figure 9 is a view of a detail of the cradle, partially in cross-section.

Figure 10 is a view in detail, showing the clamping hook mounted on the cradle.

Figure 11 is a view in perspective, showing the mounting of a trunnion on the cradle.

Figure 12 is a view partially in cross-section of the ram.

Figure 13 is a view in perspective, showing the adjusting means for the counterbalancing spring used in connection with the cradle.

Figure 14 is a cross-sectional view of the clamp showing the cammed surface engaged by the hook.

Figure 15 is a view in perspective of the clamp;

Figure 16 is a top plan view of the patterns in position on the cradle; and

Fig. 17 is a view in vertical cross-section of the pin for centering the parts of the flask relative to the patterns.

Referring now to the drawings, wherein similar reference characters refer to similar parts throughout the several views thereof, the reference character 1 designates a base, at either end of which is mounted a pair of uprights 2, 2, provided at the top with a shelf 3, in which may be placed various tools useful in connection with the operation of the machine. The base is provided with suitable wheels or rollers 4, 4, so that the machine may be moved from place to place on the foundry floor. Mounted centrally of the base is a ram 5, operated by fluid power supplied through pipes 6 and 7.

Mounted at the top of the ram is a platform 8, on which is pivotally mounted, as at 9, as is indicated in Figures 6 and 7, a swinging table formed of two parts 10 and 11, the corresponding parts 10 and 11 being provided with opposed offset arms 12 and 13, pivoted together as at 14, whereby the table may be swung on its pivot 9, clear of the platform, and then in turn swung to the open position indicated in Figure 7.

Mounted above the table is a cradle 15, shown in detail in Figure 8. The cradle 15 is in the form of a hollow frame provided at either end with trunnions 16 and 17, which are clamped in the end frames of the cradle by means of clamps 16′ having suitable recesses slightly less shallow than the diameter of the trunnions, whereby as the clamps are bolted to the end members of the cradle, the trunnions will be firmly fixed in position between the clamps and the end members. These trunnions, as indicated in Figure 2, rest within slotted bearings 18, which are in turn connected with cables 19, which pass upwardly and over pulleys 20 located at the upper ends of the uprights, the cables 19 in turn passing downwardly and being connected to the periphery of suitable discs 21, mounted rigidly on a shaft 22, supported in suitable bearings 23 on either upright. The shaft 22 has mounted rigidly upon it near one end a collar 24, to which is attached one end of a coil spring 25, the other end of the coil spring, as indicated in Figure 3, being passed through a suitable aperture in a disc 26, provided with a plurality of other apertures 27, adapted to register with an aperture 28 formed in an offset lug 29, which forms part of the bearing 23. A pin 30 may be inserted through the aperture 28 and one of the apertures 27, whereby the disc 26 may be rotated so as to place any desired tension upon the shaft 22. By this arrangement it will be seen that the effect of the spring is normally to pull the cradle to its upward position. One of the discs 21 is, moreover, provided with a radial lever 31, having a handle 32, whereby the shaft 22 may be rotated to regulate the position of the cradle relative to the uprights.

It will be noted upon examination of Figure 2 that the trunnion 16 passes through a relatively wide slot 33 formed in the uprights, this construction being duplicated in the other upright. The trunnion 16 projects through the movable bearing 18, and is provided with a collar 34 at its end. By this arrangement the trunnion will be seen to be capable of a slight relative movement in its slotted bearing 18, and furthermore, is capable of a certain lateral movement in the slot 33. The purpose of this latter movement will be apparent upon a consideration of the operation of the machine.

With reference now to the cradle, this consists of a pair of longitudinal side members formed of wood and faced with iron, it being possible to form this cradle completely of metal, if desired. Located at either end of the cradle, between the side plates, are slotted supporting plates 35, 35, in the slots 36 of which are mounted the shanks 37, of pattern locking plates 38. The shanks of these plates are provided with coil springs 39, and there is a nut 40 on the end of the shanks, whereby the pattern locking plates are held resiliently in position on the plates 35. As shown in Figure 8, the locking plates 38 are provided with slots 41, 41, along one face, together with suitable apertures 42, 42, through the body of these plates, each of these apertures having a narrow offset extension 43. The plates 38 are mounted in suitable recesses 44 cut in the faces of the side members of the cradle.

The patterns, as indicated by reference character 45 in Figure 9, consist of a base plate and the pattern proper 46. The base plates are provided with suitable bolts 47, which extend from the face of the base plates such a distance as is necessary in order that they may be engaged in the apertures and slots of the locking plates. As shown again in Figure 9, in order to secure the patterns in position, they are laid on the crossframe members of the cradle, with the bolts engaging in the slots and apertures in the locking plates. The patterns are then moved laterally a slight distance so that the bolt heads will engage under the edges of the apertures of the locking plates, the shanks passing through the apertures. The nuts 40 on the shanks of the locking plates are then turned up a slight distance so that the plate will be drawn down so as to engage the heads of the bolts 47, whereupon the patterns will be relatively securely locked in position. However, by reason of the coil spring 39 the pattern locking plates may be raised a slight distance so that the patterns may be readily slipped from their slots and removed.

Centrally of the cradle there is located a vibrator 48 driven by fluid pressure, here preferably by air, supplied through a pipe 49 provided with a spring valve 50, the pipe 49 having a flexible portion 51, and passing out of the cradle through the trunnion 17, which is apertured for the purpose. Centrally of the cradle, and positioned above the vibrator, is a clamping hook 52, to which is attached a coil spring 53 anchored at its other end in the cradle, as at 54, this spring normally tending to hold the clamping hook in the inoperative position, as indicated in Figure 10. Threaded in the shank of the hook is a rod 55, also threaded in a member 56, pivotally supported at 57 on a crosspiece 58 running between the two side members of the cradle, this arrangement making it possible to adjust the length of the hook.

As seen now in Figure 1, it will be noted that the uprights near their upper ends have inwardly extending abutments 59, 59, the lower surfaces of which are provided with wood blocks 60, 60, and supported on the lower face of the cradle is a pair of cross-heads 61, 61, also provided with bearing faces 62, 62 formed of wood. These cross-heads straddle the cradle and are movable by rods 63, 63, which project inwardly and are connected by a pivotal link 64, provided with a handle 65. Coil springs 66, 66 encircle these rods and are so arranged as normally to pull the rods to inoperative position, as indicated in Figure 1. The construction is such that when the cradle is in the inverted position, as indicated in Figure 3, the handle 65 may be manipulated as to throw the cross-heads outwardly against the force of the springs 66, so that the blocks 62 will bear against the similar blocks 60 mounted in the abutments, the friction between the two blocks being sufficient to overcome the force of the springs. However, when the cradle is lowered a slight distance so that the blocks are disengaged, the pair of springs 66 will pull the rods 63 inwardly so as to withdraw the cross-heads clear of the uprights. The blocks on the abutments and cross-heads are removable so that they may be replaced with others of different size according to the size of the flask used. As will be seen later, the abutments serve as a stop for the cradle during the squeezing operation and the length of the stroke of the ram necessary for such action would vary with the size of the flask. By changing the blocks, however, the same stroke will serve for all sizes of flasks such as may be used on this machine.

Located, as has previously been explained, centrally of the base member, is a ram 5, which upon reference to Figure 12, will be seen to consist of an external cylinder 67, in which is located a piston member 68, certain other instrumentalities being located within this piston. Between the cylinder and the piston is a chamber 69 to which a fluid, in this case compressed air, may be conducted through a conduit 70, this conduit being here provided with a safety valve 71 and a hand operated valve 72. A pressure gauge 73 is also suitably connected to their air line. The arrangement of the parts is such that upon operation of the handle 74 of the valve 72, air will be supplied to the external cylinder of the ram, which will cause the piston to be moved upwardly. At its top the piston supports the platform 8, and the ram will exert a steady upward pressure on this platform. The safety valve 71 will take care of excess pressure and when it is desired to move the piston and platform downwardly, this is taken care of by the valve 72, through which the air escapes. The escape may be regulated, as desired, so as to govern the speed of descent.

Mounted within the external piston 68 is a second cylinder 75, provided near its lower end with a plurality of escape ports 76. Within cylinder 75 is an inner movable piston 77, bolted at its upper end to the platform 8. Air is supplied to the lower end of the cylinder 75 through a conduit 78, provided with a hand-valve 79. Upon admission of air through the valve 79 into the cylinder 75, the inner piston 77 will be raised until the ports 76 are uncovered, whereupon the air pressure within the cylinder 75 will be quickly released, causing the piston 77 to drop downwardly quickly. The pressure will then build up below piston 77 and this operation will be repeated. The outer cylinder of the ram, it will be seen therefore, will be useful for exerting a steady pressure, while the inner cylinder and piston give a varying pressure, which produces a jolting action.

Mounted on the ends of the platform at its rear edges is a pair of upwardly extending guides 80, 80 formed so as to have an angular cross-section, and mounted on the front face of the cradle at either end thereof are suitable similar guides 81, 81, so positioned that when the cradle is inverted and swung slightly to the rearward position, these guides 81 will engage with the guides 80. Mounted on the uprights on the outer faces thereof, are suitable bearing plates 82, adapted to be engaged by springs 83, mounted on the slotted movable bearings 18 in which the trunnions of the cradle are supported. The action of the springs 83, bearing against the plates 82, is to cause the trunnions to move in the slots 33 in the uprights to such a position that the guides 81 on the cradle will bear against the guides 82 on the platform when the cradle is inverted, these springs insuring that the guides will make close contact one with the other. As has previously been explained, the slots 33, through which the trunnions project, are purposely made considerably wider than the diameter of the trunnions so as to permit lateral movement of the trunnions whereby the guides may be maintained in engagement. Should these guides become worn after use, the action of the spring 83 pressing against the bearing plate 82 will have a tendency to compensate for this wear.

Having thus described the construction, the operation thereof, which should be obvious, is as follows:

With the cradle now in the position indicated in Figure 1, the handle 32 will occupy an upright position indicated in Figure 2, being held locked in such position by means of a toothed plate 84 mounted on the face of the upright. The patterns are now placed upon the cradle and engaged in the pattern locking plates, whereupon the cope 85 and the drag 86 are placed in position on the patterns, these two parts, as will be understood, being positioned so as to have a reverse taper. Molding sand is now placed in the cope and drag, and with the cradle maintained in its present position, air is admitted to the inner cylinder of the ram, so as to cause a jolting action. This action is to lift the platform, the table, and the cradle, which rests upon the table, upwardly for a slight distance, depending upon the stroke of the ram. These parts are then permitted to drop quickly, due to the release of pressure in the ram, and this jolting action is repeated until the sand is tightly packed together. In case of an emergency, this jolting action may be carried on by hand, by depressing the lever 31, and thereby lifting the cradle a slight distance, permitting it to fall back against the table, the torsion spring mounted on the shaft 22 being sufficiently strong as to permit the cradle to be easily handled. When the jolting operation has been completed, the surplus sand is struck off, and the bottom plate 87 and the squeeze plate 88 placed over the drag and cope. The clamp bar 89, which is provided with a handle 90, having a cam surface 91, is then placed so that its arms overlie the bottom and squeeze plates, whereupon the clamp hook 52 is moved upwardly against its spring so as to engage the cam surface of the handle. The handle being then moved to such a position that the cam surface engaging against the face of the hook will cause the hook to hold the bar tightly in position. As was previously explained, the cam hook is adjustably mounted so that the amount of pressure exerted by it may be regulated.

With these plates clamped in position, the cradle is now to be reversed, this action being carried on by drawing the lever 31 forward, thus moving the cradle upwardly such a distance as may be necessary. A suitable arcuate handle 92 is provided on one end of the cradle whereby the cradle may be rotated on its trunnions to the inverted position, the clamp bar and hook maintaining the various parts of the mold securely in position. With the cradle inverted, the link 64 is actuated so as to force the cross-head 61 outwardly whereby the blocks 62 will engage against the blocks 60 just before the cradle reaches the limits of its upward movement, the relative position of the parts now being shown in Figure 3. With the cradle in the inverted position, the clamp bar will lie in suitable recesses 93 and 94 formed in the two parts of the table, which is of frame construction, so that any loose sand may readily pass through it. Across one of the recesses in the table is the bar 95, for a purpose later to be set forth.

With the cradle now in the inverted position, as in Figure 3, the squeezing operation is to be performed, and this is carried on by causing air to be admitted to the outward cylinder of the ram, forcing the platform and table upwardly until the table engages the squeezing and bottom plates. The air pressure will exert a steady force, which will act against these plates, forcing them into the cope and drag so as to press the sand firmly against the face of the patterns. As this action is carried on, the clamp bar will be released from the hook by reason of the fact that the plates moving upwardly will remove the pressure on the arms of the bar, permitting it to move a slight distance so that the hook actuated by its spring may clear the cammed surface. The hook will thereupon swing backwardly to the position indicated in Figure 10, and the clamp bar will drop down into the recesses in the two parts of the table. The sand is now tightly packed into the cope and drag, and there remains the operation of drawing the patterns, this operation being capable of performance either by hand or by automatic action of the machine.

For the hand draw, the action is as follows:

After the pressure is applied, thus moving the platform and table upwardly to act against the plates, and before such pressure is shut off, the cradle lever 31 is moved upwardly, this acting to slacken the cable 19 and thereby acting to release the cradle from the action of the counterbalancing spring. The table is then allowed to move down slowly, by reason of the reduction of pressure in the ram, the cradle moving with the table by gravity. The two parts, of course, will be maintained in engagement during this slight downward movement. Air pressure is then allowed to enter the vibrator mounted in the cradle, and as the vibrator is actuated the cradle is slowly raised by means of the cradle lever, the action of the vibrator causing vibrations in the table which permit the pattern to free itself from the sand, this vibration, however, not being sufficient to destroy the outlines of the pattern in the sand. It will be understood that when the cradle lever is moved so as to slacken the cradle, thereby permitting the cradle to move downwardly as the platform and table recede, the cross-head 61 will be drawn inwardly so as to clear the blocks 60. As has previously been explained, the squeezing operation releases the clamp bar, so that as the table starts upwardly again, the two parts of the flask will remain on the table while the pattern is carried clear by the upward movement of the cradle.

In order to draw the pattern by what may be called the machine draw, the action is as follows:—

With the cradle in the inverted position, the blocks 62 engaging the blocks 60, the cradle lever is kept down so as to maintain the counterbalance. Pressure is then applied to cause the platform and table to move upwardly to carry on the squeezing, and as soon as the pressure valve is released with the cradle maintained in its upward position, the vibrator is actuated. By reason of the release on the ram pressure, the table immediately begins to recede while the cradle is held in its original location. The action in the case of the machine draw amounts to drawing the mold from the pattern, while in the hand draw the pattern is drawn from the mold. In either case the guides 81 and 82 assure that the cradle, platform and table will move relatively to one another with a steady movement, so that the drawing may be accurately carried on.

When the pattern has been withdrawn by either of the methods specified, the cope and the drag are now supported on the table and are clear of the patterns. The table is then swung on its pivot 9, and the part 11 of the table swung on pivot 14 to such position as is indicated in Figure 7. There is provided a supporting rail 96 mounted on one of the uprights to support the outer edge of the part 11 of the table, this part also being provided with a handle 97 whereby the table may be swung. With the table shown in the position in Figure 7, the workman can stand between the two parts, and place the cope and drag together in the usual way, so as to complete the flask. As the table is swung outwardly with the cope and drag mounted upon it, the clamp bar will be held between one part of the flask which is mounted on the part 10 of the table, and the cross-arm 95, so that the clamp bar may be prevented from falling to the floor and may be removed and placed on the shelf before the cope and drag are taken from the table. The completed mold may then be removed to the molding floor and the various operations repeated.

Inasmuch as the cope and drag must be so positioned relatively to the patterns, that when the two are placed one on top of the other to form the flask, the outlines of the patterns in the sand will be in exact registry, some means must be provided to anchor the two parts of the flask in relation to the pattern plates. This anchoring means is illustrated in Figure 16, wherein one of the bed plates to which the patterns are attached are shown to be provided with pins 98, 98, which are adapted to enter into recesses formed in lugs 99 formed on the cope. The drag is provided with similar pins 100 which enter corresponding recesses in the bed plate of the other pattern. By this arrangement, both cope and drag will be properly centered and held against displacement relative to the patterns and then when combined to form the complete mold the pins and recesses will assure the proper registry of the two parts of the mold. These pins are preferably of a special design, and as shown in Figure 17 have a rigid portion 101 to which is secured a part 102 adapted to swing thereon and held slightly spaced by a spring 103. Should the recesses become worn due to loose sand entering between the walls of the recesses and the pin, the resiliently held portion of the pin will compensate for the wear, and under all circumstances the parts of the flask will be held in proper registry.

It will be seen that the machine consists of a number of simple instrumentalities by means of which various operations may be readily carried on by an unskilled laborer. The operation of the various parts is practically automatic, and does not require the exercise of judgment by the operator in the performance of any particular operation. Those operations which would call for the expenditure of a considerable amount of energy are carried on by power, here furnished by air under pressure, and the operation of the parts is so simple that there is no likelihood of the machine requiring more than ordinary attention. By the provision of the cross-heads, it is possible to carry on the squeezing operation without the operator exerting any force against the pressure of the ram, the blocks which engage the cross-head forming a suitable base against which the pressure of the ram is eventually exerted. The cross-heads, as will be seen, may be readily thrown into operation, and when their function has been performed, they are released and withdrawn to inoperative position.

By providing wooden blocks a slight cushioning effect is produced, and there is sufficient friction between the blocks on the frame and the cross-heads, so as to prevent the cross-heads from being withdrawn until the cradle is moved. The provision of the guides 81 and 82 together with the design of the uprights which permits a slight lateral movement, makes certain that the movements of the cradle and the table will be true relative to one another, and as has previously been explained, these guides are so designed that any wear may be automatically compensated for.

It will be seen that I have provided a machine well adapted to carry out the purposes and attain the objects previously set forth. It is so designed that the cycle of operations necessary for the production of the mold is quickly carried so that the output of the machine is very large.

As many changes could be made in this construction without departing from the scope of the following claims, it is intended that all matter contained in the above description or shown in the accompanying drawing shall be interpreted as illustrative only and not in a limiting sense.

Having thus described my invention what I claim as new and desire to secure by Letters Patent is:

1. In a machine of the class described, in combination, a movable rotatably mounted support for a pattern and a flask to confine a quantity of sand on the face of said pattern, flexible means to raise and lower said support and spring-retractable means to hold said support in a predetermined position.

2. In a machine of the class described, the combination with a movably mounted support for a pattern and a flask to confine a quantity of sand on the face of said pattern, of means to invert said support, means engaging by friction to hold said support while inverted in a predetermined position and means to guide the vertical movements of said support while inverted.

3. In a machine of the class described, the combination with a base and uprights thereon, of a cradle rotatably and movably mounted in said uprights, flexible means to raise and lower said cradle, a platform having a table thereon to support said cradle at its lower limit of movement, and means on said cradle co-operating with abutments on said uprights and operable when said cradle is in inverted position to determine the upper limit of movement of said cradle.

4. In a machine of the class described, the combination with a base and uprights thereon, of a cradle rotatably and movably mounted in said uprights, flexible means to raise and lower said cradle, a platform having a table thereon to support said cradle at its lower limit of movement, and spring-retractable means on said cradle co-operating with abutments on said uprights and operable when said cradle is in inverted position to determine the upper limit of movement of said cradle.

5. In a machine of the class described, the combination with a base and uprights thereon, of a cradle rotatably and movably mounted in said uprights, means to raise and lower said cradle, a platform having a table thereon adapted to support said cradle at the lower limit of its movement, and means on said cradle operable when said cradle is in inverted position to co-operate with means on said platform whereby to guide the movements of said cradle when the same is inverted.

6. In a machine of the class described, the combination with a base and uprights thereon, of a cradle movably and rotatably in said uprights, cross-heads on either end of said cradle slidable therealong and abutments on said uprights co-operating with said cross-heads when said cradle is in inverted position whereby to determine the limit of upward movement of said cradle.

7. In a machine of the class described, the combination with a support for the parts of a flask during the ramming and squeezing operations, of a table to support said parts thereafter, said table being formed of two members pivotally attached to each other, one of the said parts of the table having a portion pivotally attached to said support and both members of the table being movable upon said pivotal connection.

8. In a machine of the class described, the combination with means to support the parts of a flask and means to squeeze the sand therein, of a table to support the parts of the flask after said squeezing operation, said table having a part pivoted on said machine, and a second part pivoted to said first-named part intermediate the ends of said table.

9. In a machine of the class described, in combination with a platform, a table to support finished molds, said table comprising a member pivoted at one corner to said platform, and a second member pivotally attached to said first-named member and movable with respect to said first-named member and both said members movable on said first pivot.

10. In a machine of the class described, in combination a supporting member, a pattern plate fixed thereto, adapted to support the flask, said plate being provided with means adapted adjustably to determine the position of the flask upon said pattern plate.

11. In a machine of the class described, the combination with the cradle, the pattern plate and a flask of co-operating adjustable means between the pattern plate and the flask adapted to determine the position of the flask relative to the pattern plate.

12. In a machine of the class described, in combination, a supporting member, a pattern plate fixed thereto, a flask supported upon the pattern plate, said pattern plate and said flask having co-operating, male and female parts, each set of engaging male and female parts having relatively adjustable elements adapted to take up wear.

13. In a machine of the class described, the combination with a base and uprights thereon, of a cradle rotatably mounted in bearings, flexible cables connecting said bearing to a spring-held shaft, means on said cradle to support a pattern and a flask on the face thereof, means to retain a quantity of sand within said flask when said cradle is inverted, means to squeeze said sand, and a table to support the finished flasks after the squeezing operation, said table having a part pivotally mounted to said machine and a second part pivotally mounted on said first-named part.

14. In a machine of the class described, the combination with a base and uprights thereon, of a cradle rotatably mounted on trunnions in bearings movably mounted on said uprights, means to raise and lower said cradle, means to permit said cradle a relatively slight lateral movement and means operable when said cradle is inverted to confine said lateral movement.

15. In a machine of the class described, the combination with a base and uprights thereon, of a rotatable cradle mounted on said uprights and capable of vertical and relatively slight lateral movement, a platform upon which said cradle rests at its lower limit of movement, guides on said cradle, operable when said cradle is in inverted position to co-operate with guides on said platform and means on said uprights to maintain said guides in engagement.

16. In a machine of the class described, the combination with a base and uprights thereon, of a cradle rotatably mounted in bearings supported from said uprights, said bearings being capable of vertical and relatively slight horizontal movement, a platform upon which said cradle rests at its lower limit of movement, guides on said cradle, operable when said cradle is in inverted position to co-operate with guides on said platform, and spring means on said uprights to maintain said guides in engagement, said guides being so designed as to compensate for wear on the surfaces thereof.

In testimony whereof, I affix my signature in the presence of two witnesses:

JOHN A. SPERRY.

Witnesses:
 HOLDRIDGE G. GREENE,
 FRED L. HULL.